United States Patent
Kaufmann

(10) Patent No.: US 11,796,019 B2
(45) Date of Patent: Oct. 24, 2023

(54) DISC BRAKE DEVICE FOR A VEHICLE AND VEHICLE WITH SUCH A DISC BRAKE DEVICE

(71) Applicant: VOLKSWAGEN AKTIENGESELLSCHAFT, Wolfsburg (DE)

(72) Inventor: Karl-Friedrich Kaufmann, Gifhorn (DE)

(73) Assignee: Volkswagen Aktiengesellschaft

( * ) Notice: Subject to any disclaimer, the term of this patent is extended or adjusted under 35 U.S.C. 154(b) by 119 days.

(21) Appl. No.: 17/185,181

(22) Filed: Feb. 25, 2021

(65) Prior Publication Data

US 2021/0262540 A1    Aug. 26, 2021

(30) Foreign Application Priority Data

Feb. 25, 2020   (DE) .................... 10 2020 202 422.7

(51) Int. Cl.
| | |
|---|---|
| *F16D 65/00* | (2006.01) |
| *F16D 55/00* | (2006.01) |
| *F16D 55/22* | (2006.01) |

(52) U.S. Cl.
CPC .......... *F16D 65/0031* (2013.01); *F16D 55/22* (2013.01); *F16D 2055/0037* (2013.01)

(58) Field of Classification Search
CPC ...... F16D 65/0031; F16D 55/22; F16D 65/02; F16D 2055/005; F16D 2065/1392; F16D 55/225
See application file for complete search history.

(56) References Cited

U.S. PATENT DOCUMENTS

| 5,035,304 A | 7/1991 | Bösch |
| 8,701,844 B2 | 4/2014 | Tsiberidis |
| (Continued) | | |

FOREIGN PATENT DOCUMENTS

| DE | 3934422 A1 | 4/1990 |
| DE | 102006051972 A1 | 5/2008 |
| (Continued) | | |

OTHER PUBLICATIONS

United Kingdom Patent Application No. GB1904751.3; filed Apr. 4, 2019; Publication No. GB2583457; published Nov. 4, 2020.

(Continued)

*Primary Examiner* — Pamela Rodriguez
(74) *Attorney, Agent, or Firm* — BARNES & THORNBURG, LLP

(57) ABSTRACT

A disc brake device for a transportation vehicle having a brake disc, brake pads placed in frictional contact with the brake disc, a brake carrier, and a brake dust collecting device having a brake dust collecting housing situated behind the brake carrier as viewed in a main direction of rotation of the brake disc, wherein the brake dust collecting housing is connected to the brake carrier. Within the brake dust collecting housing, there is arranged a brake dust guiding housing having a U-profile cross section covering the brake disc radially at the outside, wherein the brake dust guiding housing forms a flow channel with an inlet and an outlet for an air stream generated by the rotating brake disc and carrying brake dust to a filter medium of the brake dust collecting housing, and wherein the brake dust guiding housing generates a turbulent air stream in the flow channel.

18 Claims, 4 Drawing Sheets

(56) References Cited

U.S. PATENT DOCUMENTS

| | | |
|---|---|---|
| 9,291,222 B2 | 3/2016 | Hummel et al. |
| 2014/0054121 A1 | 2/2014 | Hummel et al. |
| 2014/0076673 A1* | 3/2014 | Tsiberidis ............... F16D 55/22 |
| | | 188/73.1 |
| 2020/0271176 A1* | 8/2020 | Bock ....................... F16D 65/02 |

FOREIGN PATENT DOCUMENTS

| | | |
|---|---|---|
| DE | 102010053879 A1 * | 6/2012 |
| DE | 102012016835 A1 | 5/2014 |
| DE | 102020125273 A1 * | 3/2022 |
| DE | 102020125399 A1 * | 3/2022 |
| EP | 3018379 A1 | 5/2016 |
| WO | WO-2019/048374 A1 * | 3/2019 |
| WO | 2019238291 A1 | 12/2019 |

OTHER PUBLICATIONS

Office Action; Chinese Patent Application No. 202110211059.5; dated Jul. 27, 2022.
Search Report; Chinese Patent Application No. 202110211059.5; dated Jul. 22, 2022.

* cited by examiner

DISC BRAKE DEVICE FOR A VEHICLE AND VEHICLE WITH SUCH A DISC BRAKE DEVICE

PRIORITY CLAIM

This patent application claims priority to German Patent Application No. 10 2020 202 422.7, filed 25 Feb. 2020, the disclosure of which is incorporated herein by reference in its entirety.

SUMMARY

Illustrative embodiments relate to a disc brake device for a transportation vehicle and a transportation vehicle having a the disc brake device.

BRIEF DESCRIPTION OF THE DRAWINGS

Disclosed embodiments will be discussed in more detail below with reference to the drawings. The disclosed embodiments are not restricted to this, but encompasses all configurations defined. In the drawings.

DETAILED DESCRIPTION

Figure 1:
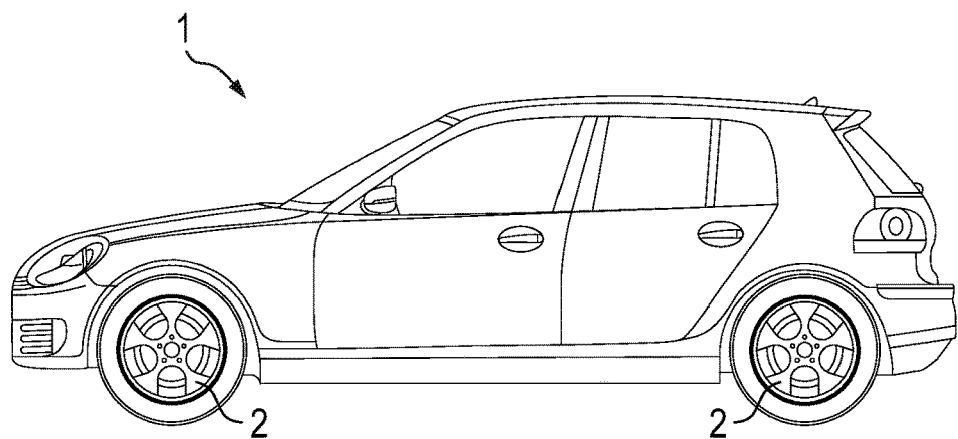
FIG. 1 schematically shows a transportation vehicle equipped with a disclosed disc brake device.

DE 10 2006 051 972 A1 has already disclosed a disc brake device for a transportation vehicle, having a brake disc, having brake pads which can be placed in frictional contact with the brake disc, having a brake carrier for the connection of the disc brake device to a wheel carrier of the transportation vehicle and for the mounting of a brake caliper, and having a brake dust collecting device. The brake dust collecting device has a first and a second housing part, wherein the second housing part (brake dust collecting housing) is arranged spaced apart from the brake carrier as viewed in a main direction of rotation of the brake disc, and the first housing part (brake dust guiding housing) occupies the spacing between the brake carrier and the second housing part. The housing parts have a predominantly U-profile-like cross section and engage over the brake disc from above. The first housing part has, at one end, that is to say on the side of the brake carrier, a funnel-like inlet region and, at the other end, that is to say on the side of the second housing part, an outlet region for an air stream, which is generated by the rotating brake disc and which carries brake dust, to the second housing part. The second housing part comprises at least one brake dust collecting chamber. For the guidance of the brake dust into the brake dust collecting chamber, the first and second housing parts have, according to at least one disclosed embodiment, lamellae which run along the guide channel formed for the air stream. Furthermore, it is provided that the first housing part tapers continuously. These measures are intended to have the effect that the flow speed of the air stream in the first housing part is increased, and thus the adherence of brake dust to the first housing part is prevented. It is the intention for the flow speed to abruptly decrease in the second housing part, such that the brake dust can be deposited therein. Furthermore, the first housing part has air inlet openings for the cooling of the brake disc.

Disclosed embodiments create an alternative disc brake device in relation to the prior art, which is improved with regard to a reliable and efficient transfer of abraded brake material or brake dust into a brake dust collecting device of the disc brake device. Disclosed embodiments also provide a transportation vehicle having the disclosed disc brake device.

In the disclosed embodiments, contrary to the prior art (DE 10 2006 051 972 A1), which favors a substantially laminar air stream with a high flow speed in the flow channel, a turbulent air stream in the flow channel effectively improves the capability of the generated air stream to pick up brake dust and reliably guide it to the brake dust collecting housing together with filter medium conventionally situated therein.

Proceeding from a disc brake device for a transportation vehicle, having a brake disc, having brake pads which can be placed in frictional contact with the brake disc, having a brake carrier, and having a brake dust collecting device which has a brake dust collecting housing which is situated behind the brake carrier as viewed in a main direction of rotation of the brake disc, wherein the brake dust collecting housing is connected to the brake carrier, the stated objective is achieved in that, within the brake dust collecting housing, there is arranged a brake dust guiding housing which has a U-profile-like cross section which covers the brake disc radially at the outside, wherein the brake dust guiding housing forms a flow channel with an inlet and an outlet for an air stream, which is generated by the rotating brake disc and which carries brake dust, to a filter medium of the brake dust collecting housing, and wherein the brake dust guiding housing has, in the interior thereof, methods or mechanisms for generating a turbulent air stream in the flow channel.

Accordingly, may be provided that the method or mechanism for generating a turbulent air stream are arranged in the region of the inlet of the flow channel of the brake dust guiding housing. The turbulent air stream generated at the inlet propagates into the brake dust collecting housing, where entrained brake dust can then be easily filtered out.

As is also provided, the method or mechanism for generating a turbulent air stream within the flow channel are formed by projections which extend into the flow channel, which projections can be easily and inexpensively formed or arranged on the brake dust guiding housing. The projections may thus be attached to the inner contour of the brake dust guiding housing, for example, cohesively by adhesive bonding, or injection-molded thereon by a plastics injection molding process.

It is, however, possible for the projections to be formed integrally with the brake dust guiding housing, which results in savings of material, weight and manufacturing time.

With regard to this, in a disclosed embodiment, the projections are formed out of the material of the brake dust guiding housing by a punching and bending process such that the projections are arranged so as to be angled from the inner contour of the brake dust guiding housing into the interior of the brake dust guiding housing in each case by an angle "a" and each leave behind a passage opening in the brake dust guiding housing. The passage opening provides the benefit that, during the operation of the transportation vehicle, external air is drawn through the passage opening into the flow channel from the outside, which external air may likewise contain brake dust and moreover assists the generation of turbulence in the air stream.

From tests performed in relation to the subject matter of the application, an angle "a" of 10° to 90°, optionally 45°, has proven to be particularly beneficial.

The projections may each have a shape which is formed by two or more cut lines generated by punching and which is arranged so as to be angled into the interior of the brake dust guiding housing.

It is possible for projections to have a triangular shape in each case resulting from two cut lines are arranged with one side fixedly on the brake dust guiding housing such that their free corner which points into the flow channel may furthermore be directed toward the brake carrier. By virtue of the fact that the free corner thus points counter to the course of the flow of the air stream, the desired turbulences in the air stream can be generated particularly effectively.

According to a further disclosed embodiment, to attain a maximum introduction of air, enriched with brake dust, into the brake dust guiding housing, the brake dust guiding housing may, in the region of the inlet, have a funnel-like shape which narrows in the direction of the brake dust collecting housing, which furthermore results in an increased flow speed of the air stream in the downstream section of the flow channel owing to the decreasing flow cross section.

It may furthermore be provided, in combination with the above measure or independently, that the brake dust guiding housing has a funnel-like widening shape in the region of the outlet of the flow channel. In this case, the outlet is designed like a flow diffuser, which reduces the outlet speed to an optimum level for the deposition of the brake dust, which is entrained in the air stream, in the brake dust collecting housing. It is the case here that the air stream together with entrained brake dust is guided along the wall of the brake dust collecting housing into the filter medium, whereby the efficiency of separation of the brake dust is further optimized.

The disclosed embodiments also relate to a transportation vehicle having the disclosed disc brake device.

Figure 2:
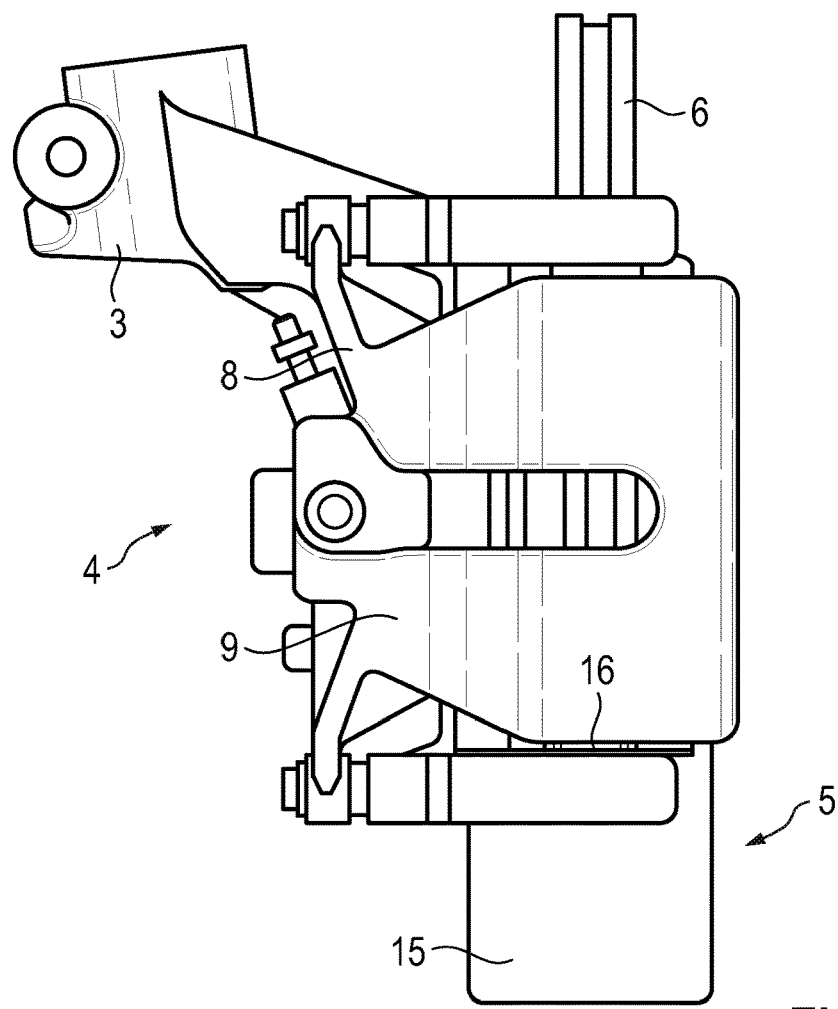
FIG. 2 shows a plan view of the disclosed disc brake device with the illustration of a wheel carrier on which the disc brake device is held together with a brake dust collecting device of the disc brake device.
Figure 3:
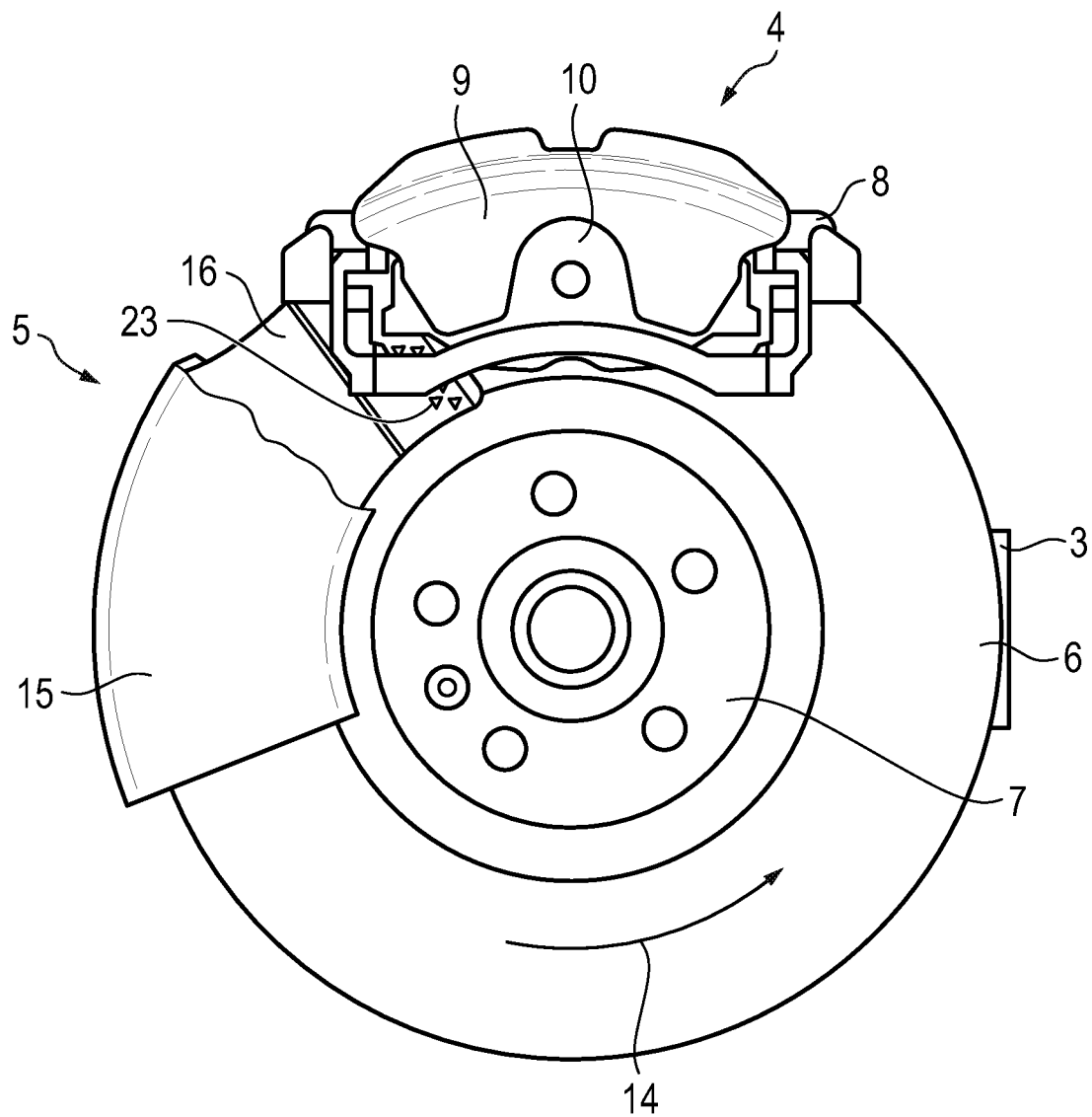
FIG. 3 shows a side view of the disc brake device of FIG. 2 with a brake dust collecting housing of the brake dust collecting device, which brake dust collecting housing is illustrated in section and in which brake dust collecting housing there is arranged an brake dust guiding housing.

FIG. 1 firstly highly schematically shows a transportation vehicle 1, in the present case a passenger transportation vehicle, which, as per FIGS. 2 and 3, has a wheel-controlling wheel carrier 3, with in each case one disc brake device 4 together with a brake dust collecting device 5 assigned thereto, at each transportation vehicle wheel 2. The disc brake device 4 firstly has a brake disc 6 which is connected rotationally conjointly to the respective transportation vehicle wheel 2 by a brake disc nave 7 which is formed or arranged radially at the inside on the brake disc. Secondly, the disc brake device 4 has a brake carrier 8 with a movable brake caliper 9, which engages over the brake disc 6 radially at the outside, and within each case one brake pad 10, 11 with brake lining 12, 13 on each side of the brake disc 6. By use of a drive which is formed, for example, by a hydraulically actuated brake piston (not illustrated in the drawing), the brake pads 10, 11, or the brake linings 12, 13 thereof, can be placed in frictional contact with the brake disc 6 or pressed against the brake disc 6.

As is generally known, an actuation of a brake results in abraded brake material, also referred to as brake dust (not illustrated in the drawing), which is conventionally released into the surroundings as a result of a ventilation action of the brake disc 6. To counteract this situation, the disc brake device 4 has the abovementioned brake dust collecting device 5, which collects the brake dust that is released from the brake disc 6 and from the brake linings 12, 13. The brake dust collecting device 5 has, as viewed in a main direction of rotation 14 of the brake disc 6, a brake dust collecting housing 15 which is arranged after the brake carrier 8 and which is connected to the latter. The main direction of rotation 14 of the brake disc 6 is to be understood to mean the direction of rotation of the brake disc associated with forward travel of the transportation vehicle 1 (cf. FIG. 3).

Figure 4:
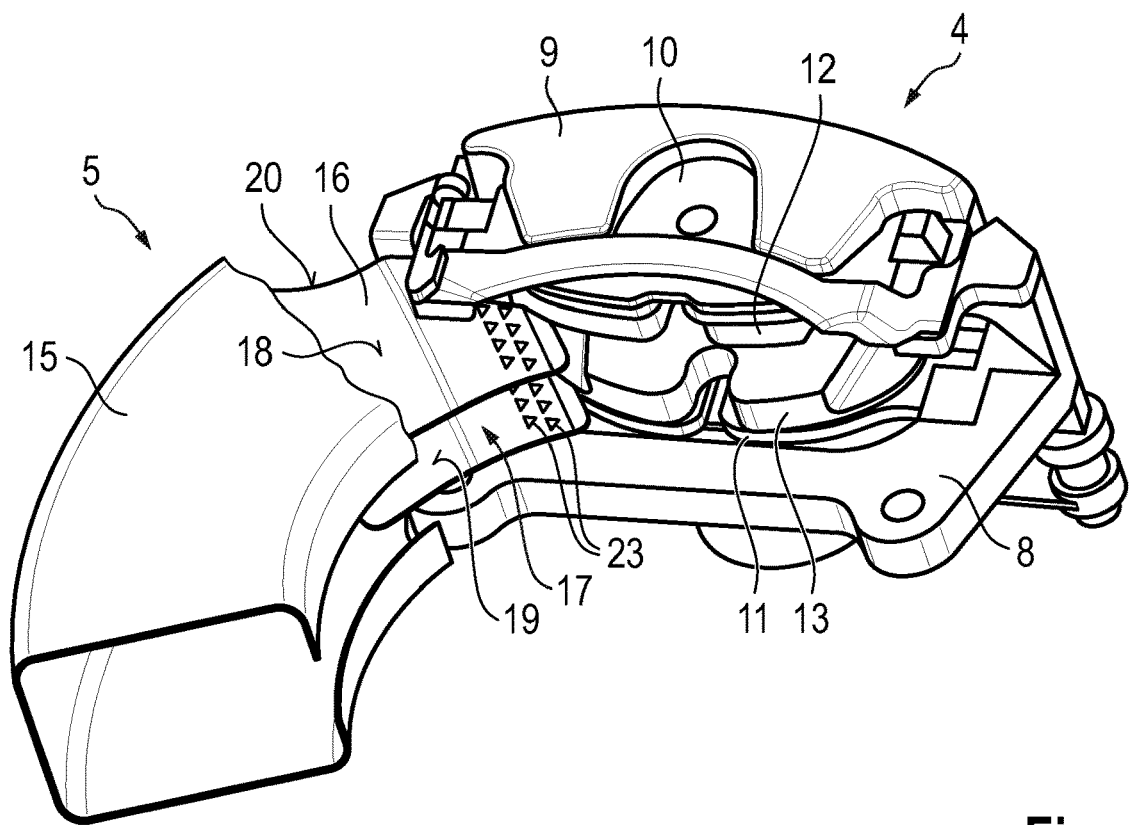
FIG. 4 is a perspective illustration of the disc brake device of FIG. 3, but without a brake disc thereof.
Figure 5:
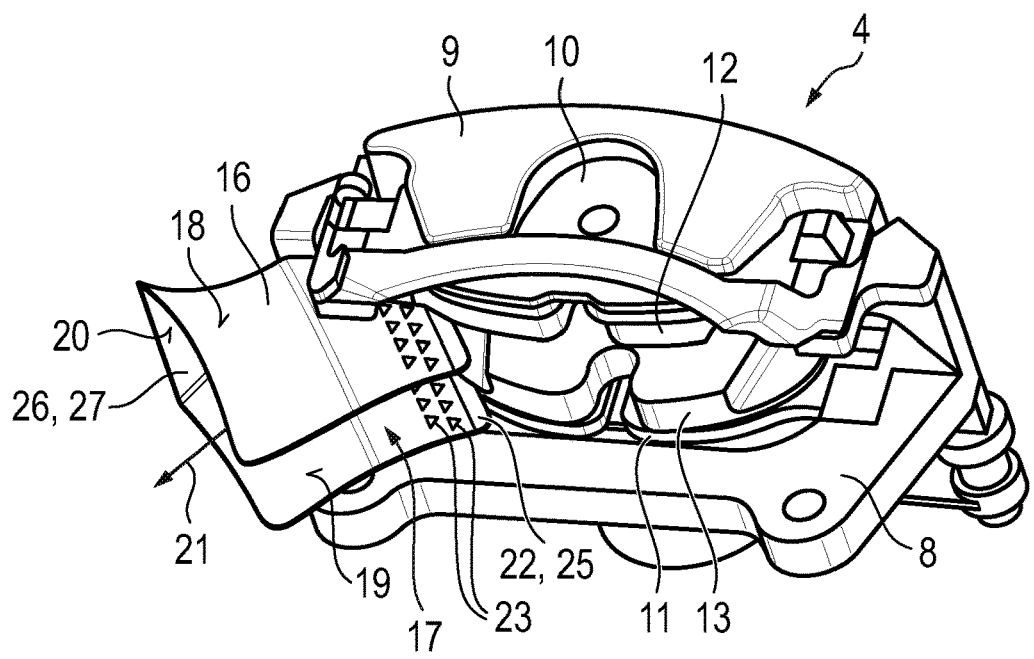
FIG. 5 is a perspective illustration of the disc brake device of FIG. 4 with the brake dust guiding housing illustrated on its own.
Figure 6:
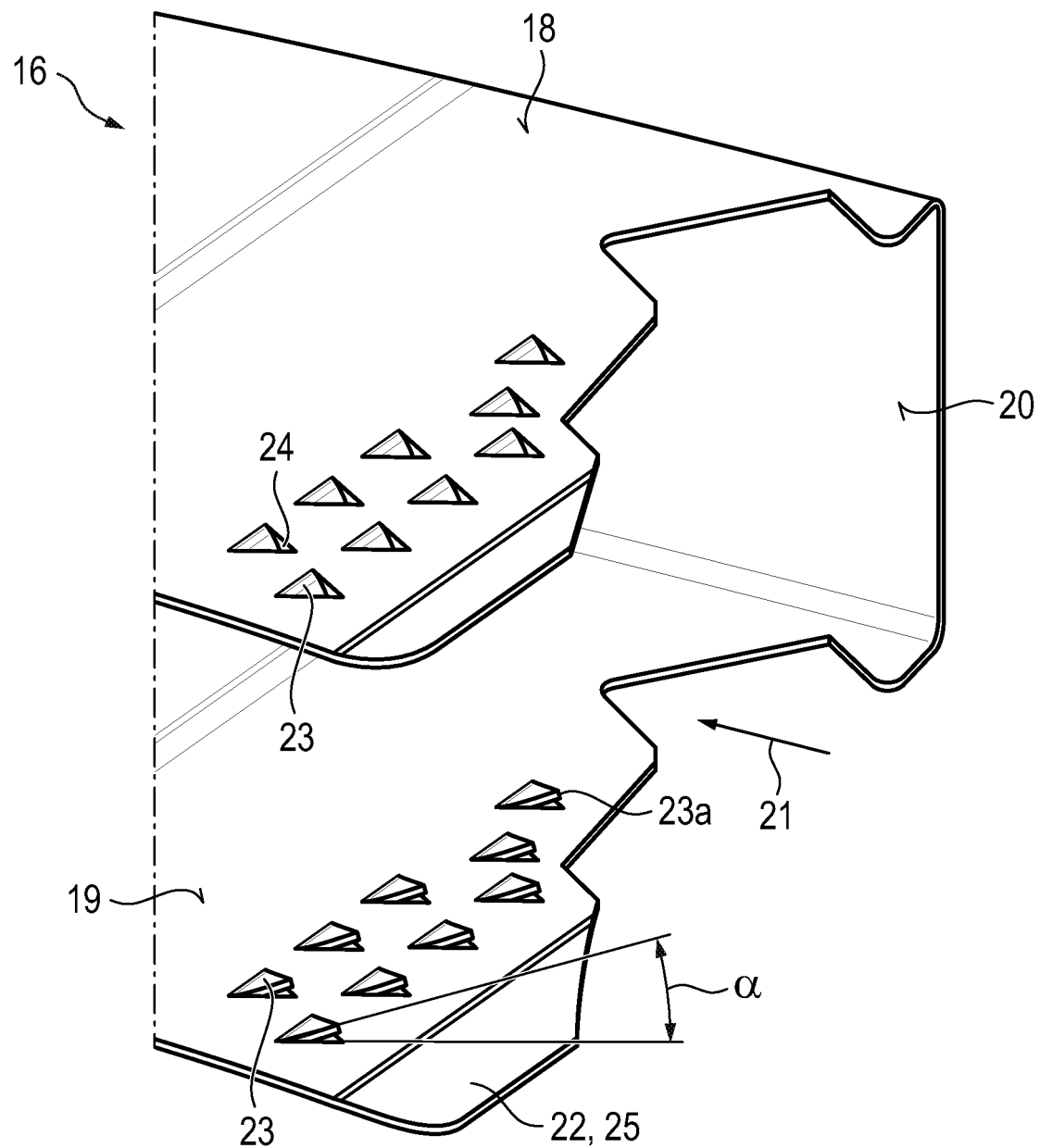
FIG. 6 is a perspective detail illustration of the brake dust guiding housing.

Arranged within the brake dust collecting housing 15 is a brake dust guiding housing 16. Both the brake dust collecting housing 15 and the brake dust guiding housing 16 have a U-profile-like cross section and are placed over the brake disc 6 radially from the outside and thus encompass the brake disc on both sides (cf. in particular, FIG. 4).

In the present case, the brake dust guiding housing 16 extends, at one end, to a point close to the brake pads 10, 11 and, at the other end, into the brake dust collecting housing 15. The brake dust guiding housing 16 thus forms a flow channel 17 which is delimited by two side walls 18, 19 and by a covering wall 20 which connects the side walls to one another. The flow channel 17 serves for guiding an air stream 21, which runs in a direction of rotation of the brake disc 6, from the brake pads 10, 11 to a brake dust filter medium which is not illustrated in the drawing and which is arranged within the brake dust collecting housing 15, wherein brake dust which is released is entrained, and conducted into the brake dust collecting housing 15 and furthermore into the filter medium, by the air stream 21.

As can be seen from FIGS. 3 to 6, the brake dust guiding housing 16 has methods or mechanisms for generating a turbulent air stream 21. The benefits of such a turbulent air stream 21 have already been described above. In the present case, the method or mechanism for generating a turbulent air stream 21 are arranged in the region of the inlet 22, arranged at the brake pad side, of the flow channel 17. The disclosed embodiments are, however, not restricted to this arrangement, but may also provide the method or mechanism at some other, or additionally at another, location of the flow channel 17 (not illustrated in the drawing).

The method or mechanism for generating a turbulent air stream 21 within the flow channel 17 are provided, merely by way of example, on the side walls 18, 19 of the brake dust guiding housing 16. Alternatively or in combination with this measure, the method or mechanism for generating a turbulent air stream 21 may also be provided on the covering wall 20 which connects the side walls 18, 19 to one another (not illustrated in the drawing). The method or mechanism for generating a turbulent air stream 21 are formed in the present case by projections 23 which extend from the inner contour of the brake dust guiding housing 16 into the flow channel 17 and thus into the air stream 21.

In an exemplary embodiment which is not illustrated in the drawing, provision may be made of separately produced projections 23 which are attached to the inner contour of the brake dust guiding housing 16, which are cohesively attached by adhesive bonding to the brake dust guiding housing 16. In another exemplary embodiment which is not illustrated in the drawing, the projections 23 may also be injection-molded onto the inner contour of the brake dust guiding housing 16 by a plastics injection molding process known per se.

Alternatively, the projections 23 are however formed integrally with the brake dust guiding housing 16. In this respect, FIGS. 3 to 6 show a brake dust guiding housing 16 with projections 23 which may be formed out of the material of the brake dust guiding housing 16 by a punching and bending process known per se. Since the brake dust guiding housing 16 may be produced from a metal sheet, alternatively from a heat-resistant and impact-resistant plastics plate, projections 23 produced in this way can be easily and inexpensively realized by way of the punching and bending process.

Here, the projections 23 are formed out of the material of the brake dust guiding housing 16 such that they are arranged so as to be angled from the inner contour of the brake dust guiding housing 16 into the interior of the brake dust guiding housing 16 in each case by an angle "a" (cf. FIG. 6) and, here, each leave behind a passage opening 24 in the brake dust guiding housing. From tests, an angle "α" of 10° to 90°, optionally of 45°, has proven beneficial.

As regards the passage opening 24, this has the major benefit that, during the operation of the transportation vehicle 1, external air is drawn through the passage opening into the flow channel 17 from the outside, which external air may likewise contain brake dust and moreover assists the desired generation of turbulence in the air stream 21.

In this exemplary embodiment, the projections 23 each have a triangular shape by virtue of the fact that they are arranged with one side fixedly on the brake dust guiding housing 16 and so as to be angled into the interior thereof. Such projections can be produced with little outlay, because they comprise only two cut lines generated by the punching. The disclosed embodiments are, however, not restricted to this shape of the projections 23, but rather encompasses any other suitable shape, for example, also a shape which requires more than two cut lines.

As can also be seen from FIGS. 3 to 6, the projections 23 each with a triangular shape may be fixedly arranged with one side on the brake dust guiding housing 16 such that their free corner 23a which points into the flow channel 17 is directed toward the brake carrier 8. By virtue of the fact that the free corner 23a thus points counter to the course of the flow of the air stream 21, the desired turbulences in the air stream 21 can be generated particularly effectively.

To attain a maximum introduction of air, enriched with brake dust, into the brake dust guiding housing 16, the brake dust guiding housing, in that region of the inlet 22 of the flow channel 17 which is arranged on the brake pad side, has a funnel-like shape which narrows in the direction of the brake dust collecting housing 15. The inlet funnel 25 that is formed furthermore gives rise to an increased flow speed of the air stream 21 in the downstream section of the flow channel 17 owing to the decreasing flow cross section (cf. in particular, FIG. 6).

By contrast, the brake dust guiding housing 16 has, in the region of the outlet 26 of the flow channel 17, a funnel-like shape which widens in the direction of the brake dust collecting housing 15. The outlet funnel 27 that is formed is designed like a flow diffuser, which reduces the outlet speed of the air stream 21 to an optimum level for the deposition of the brake dust, which is entrained in the air stream 21, in the filter medium of the brake dust collecting housing 15 (cf. in particular, FIG. 5). It is the case here that the brake dust is guided along the wall of the brake dust collecting housing 15 to the filter medium, whereby the efficiency of separation of the brake dust is optimized.

LIST OF REFERENCE DESIGNATIONS

1 Transportation vehicle
2 Vehicle wheel
3 Wheel carrier
4 Disc brake device
5 Brake dust collecting device
6 Brake disc
7 Brake disc nave
8 Brake carrier
9 Brake caliper
10 Brake pad
11 Brake pad
12 Brake lining
13 Brake lining
14 Main direction of rotation
15 Brake dust collecting housing
16 Brake dust guiding housing
17 Flow channel
18 Side wall
19 Side wall
20 Covering wall
21 Air stream
22 Inlet
23 Projection
23a Corner
24 Passage opening
25 Inlet funnel
26 Outlet
27 Outlet funnel
"α" Angle

The invention claimed is:

1. A disc brake device for a transportation vehicle, the disc brake device comprising:
a brake disc;
brake pads placed in frictional contact with the brake disc;
a brake carrier; and
a brake dust collecting device comprising a brake dust collecting housing situated behind the brake carrier as viewed in a main direction of rotation of the brake disc, wherein the brake dust collecting housing is connected to the brake carrier, the brake dust collecting housing including a brake dust guiding housing defining at least a portion of a U-profile cross section arranged covering the brake disc radially at the outside,
the brake dust guiding housing including walls defining a flow channel including an inlet and an outlet for an air stream, which is generated by the rotating brake disc and which carries brake dust towards a filter medium of the brake dust collecting housing, the brake dust guiding housing including projections extending from at least one of the walls with a free end directed into the flow channel configured to generate a turbulent air stream in the flow channel.

2. The disc brake device of claim 1, wherein the turbulent air stream is generated in a region of the inlet of the flow channel of the brake dust guiding housing.

3. The disc brake device of claim 1, wherein the projections are formed integrally with the brake dust guiding housing.

4. The disc brake device of claim 3, wherein the projections are formed of the material of the brake dust guiding housing by a punching and bending process such that the projections are arranged angled from the inner contour of the brake dust guiding housing into the interior of the brake dust guiding housing in each case by an angle La), wherein the punching and bending process of each projection results in a passage opening in the brake dust guiding housing.

5. The disc brake device of claim 4, wherein the angle (a) is an angle in a range of 10° to 90°.

6. The disc brake device of claim 5, wherein the projections are triangular formed by two cut lines such that each of the projections are arranged with one side fixedly attached to the brake dust guiding housing and a free corner pointing into the flow channel is directed toward the brake carrier.

7. The disc brake device of claim 5, wherein the projections are triangular formed by two cut lines such that each of the projections are arranged with one side fixedly attached to the brake dust guiding housing and a free corner pointing into the flow channel is directed toward the brake carrier.

8. The disc brake device of claim 4, wherein each projection has a shape formed by two or more cut lines angled into the interior of the brake dust guiding housing.

9. The disc brake device of claim 1, wherein the brake dust guiding housing comprises a funnel located in a region of the inlet and/or of the outlet of the flow channel.

10. A transportation vehicle having the disc brake device of claim 1.

11. The disc brake device of claim 1, wherein the brake dust guiding housing comprises a funnel located in a region of the inlet and/or of the outlet of the flow channel.

12. A disc brake device for a transportation vehicle, the disc brake device comprising:
a brake carrier for mounting with brake pads operable for selective frictional contact with a brake disc of the transportation vehicle; and
a brake dust collecting device comprising a brake dust collecting housing connected with and situated within the brake carrier, the brake dust collecting housing including a brake dust guiding housing defining at least a portion of a U-profile cross section arranged for radially covering the brake disc,
the brake dust guiding housing including walls defining a flow channel including an inlet and an outlet for air from rotation of the brake disc which carries brake dust, the brake dust guiding housing including projections extending from the walls with a free end directed into the flow channel configured to generate a turbulent air stream in the flow channel.

13. The disc brake device of claim 12, wherein the turbulent air stream is generated in a region of the inlet of the flow channel of the brake dust guiding housing.

14. The disc brake device of claim 12, wherein the projections are formed integrally with the brake dust guiding housing.

15. The disc brake device of claim 14, wherein the projections are formed of the material of the brake dust guiding housing by a punching process such that the projections are arranged angled from the inner contour of the brake dust guiding housing into the interior of the brake dust guiding housing in each case by an angle ($\alpha$), wherein the punching and bending process of each projection results in a passage opening in the brake dust guiding housing.

16. The disc brake device of claim 15, wherein the angle ($\alpha$) is an angle in a range of 10° to 90°.

17. The disc brake device of claim 15, wherein each projection has a shape formed by two or more cut lines angled into the interior of the brake dust guiding housing.

18. A transportation vehicle having the disc brake device of claim 12.

* * * * *